US009589495B2

(12) United States Patent
Tsuei et al.

(10) Patent No.: US 9,589,495 B2
(45) Date of Patent: Mar. 7, 2017

(54) LIQUID CRYSTAL DISPLAY AND DISPLAY METHOD THEREOF

(71) Applicant: InnoLux Corporation, Miao-Li County (TW)

(72) Inventors: Bo-Chin Tsuei, Miao-Li County (TW); Chih-Ting Chen, Miao-Li County (TW); Jian-Chen Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 227 days.

(21) Appl. No.: 14/284,237

(22) Filed: May 21, 2014

(65) Prior Publication Data
US 2014/0354707 A1    Dec. 4, 2014

(30) Foreign Application Priority Data

May 28, 2013    (TW) .............................. 102118731 A

(51) Int. Cl.
*G09G 3/20*    (2006.01)
*G09G 3/00*    (2006.01)
(Continued)

(52) U.S. Cl.
CPC .......... *G09G 3/2007* (2013.01); *G09G 3/003* (2013.01); *G09G 3/36* (2013.01); *G09G 3/3614* (2013.01);
(Continued)

(58) Field of Classification Search
CPC ... G09G 2300/0443; G09G 2310/0205; G09G 2320/0209; G09G 2340/0407;
(Continued)

(56) References Cited

U.S. PATENT DOCUMENTS

2002/0149598 A1* 10/2002 Greier ................. G09G 3/3611
345/589
2004/0061711 A1* 4/2004 Kurumisawa ........ G09G 3/3607
345/698
(Continued)

FOREIGN PATENT DOCUMENTS

TW         20634708        10/2006

OTHER PUBLICATIONS

Taiwanese language office action dated Oct. 9, 2014.
(Continued)

*Primary Examiner* — Latanya Bibbins
(74) *Attorney, Agent, or Firm* — McClure, Qualey & Rodack, LLP

(57) ABSTRACT

A liquid crystal display includes a plurality of dots arranged in a matrix formed with pixel columns and pixel rows, wherein each of the dots includes at least a pixel and displays a dot of a first resolution image and the dot size is at least 0.018 mm$^2$ and at most 0.16 mm$^2$, wherein each of the pixel columns is supplied with driving signals having the same polarity, wherein when the liquid crystal display receives a second resolution image signal having dots fewer than the first resolution image signal, a dot of a second resolution image is displayed by at least a high gray-level pixel and at least a low gray-level pixel which displays a gray level lower than the high gray-level pixel, and each of the pixel rows is formed by a plurality of the high gray-level pixels or a plurality of the low gray-level pixels.

18 Claims, 9 Drawing Sheets

(51) Int. Cl.
 G09G 3/36 (2006.01)
 H04N 13/04 (2006.01)
(52) U.S. Cl.
 CPC ....... *H04N 13/0497* (2013.01); *G09G 3/2051* (2013.01); *G09G 2300/0443* (2013.01); *G09G 2310/0205* (2013.01); *G09G 2320/0209* (2013.01); *G09G 2340/0407* (2013.01); *G09G 2340/0421* (2013.01); *G09G 2340/0428* (2013.01)
(58) Field of Classification Search
 CPC ... G09G 2340/0421; G09G 2340/0428; G09G 3/003; G09G 3/2007; G09G 3/2051; G09G 3/36; G09G 3/3614; H04N 13/0497
 See application file for complete search history.

(56) References Cited

U.S. PATENT DOCUMENTS

| | | | |
|---|---|---|---|
| 2009/0207100 A1* | 8/2009 | Fukuchi | G02F 1/133514 345/32 |
| 2009/0324090 A1 | 12/2009 | Tanaka | |
| 2013/0010007 A1* | 1/2013 | Ito | G09G 3/003 345/690 |

OTHER PUBLICATIONS

European Search Report dated Oct. 24, 2014.
English language translation of abstract of TW 20634708 (published Oct. 1, 2006).

* cited by examiner

LIQUID CRYSTAL DISPLAY AND DISPLAY METHOD THEREOF

CROSS REFERENCE TO RELATED APPLICATIONS

This Application claims priority of Taiwan Patent Application No. 102118731, filed on May 28, 2013, the entirety of which is incorporated by reference herein.

BACKGROUND OF THE INVENTION

Field of the Invention

The present invention relates to a liquid crystal display and a display method thereof, and in particular relates to a liquid crystal display and a display method thereof for reducing contours caused by horizontal crosstalk when displaying low-resolution images.

Description of the Related Art

The 4K2K liquid crystal display is one of the newest specifications promoted in the television market. 4K2k is the abbreviation of a resolution such as 3840×2160. This resolution is four times as high as Full HD resolution, which is 1920×1080, and so the 4K2K television is also known as "ultra-high definition" television.

However, the number of driving ICs increases as the resolution increases. An active matrix display comprises a plurality of dots arranged in a matrix formed with pixel columns and pixel rows (In this specification, a dot comprises a plurality of pixels, and each pixel is used to display a color). Therefore, if a pixel column is driven by a single data line with the same polarity, the number of driving ICs can be reduced to lower the manufacturing cost. Nevertheless, this driving method easily produces issues of horizontal crosstalk.

In view of the above-mentioned facts, the invention optimizes arrangements of high gray-level pixels and low gray-level pixels to reduce undesired contours caused by horizontal crosstalk when a high-resolution TV displays low-resolution images.

BRIEF SUMMARY OF THE INVENTION

A detailed description is given in the following embodiments with reference to the accompanying drawings.

The invention provides a liquid crystal display, including: a plurality of dots arranged in a matrix formed with pixel columns and pixel rows, wherein each of the dots comprises at least a pixel and is used for displaying a dot of a first resolution image and the dot size is equal to or larger than 0.018 mm$^2$ and equal to or smaller than 0.16 mm$^2$, wherein each of the pixel columns is supplied with driving signals having the same polarity, and wherein when the liquid crystal display receives a second resolution image signal having dots fewer than the first resolution image signal, a dot of a second resolution image is displayed by at least a high gray level pixel and at least a low gray level pixel which displays a gray level lower than the high gray level pixel, and each of the pixel rows is formed by a plurality of the high gray level pixels or a plurality of the low gray level pixels.

In the case where the second resolution image signal is a 2D image signal, when the liquid crystal display outputs the second resolution image, a pixel row formed by the high gray level pixels and a pixel row formed by the low gray level pixels are arranged alternately in the column direction.

In the case where the second resolution image signal is a 3D image signal, when the liquid crystal display outputs the second resolution image, two pixel rows formed by the high gray level pixels and two pixel rows formed by the low gray level pixels are arranged alternately in the column direction.

When the liquid crystal display displays a 3D image, the liquid crystal display performs a progressive scan in such a manner that every two pixel rows are scanned at the same time, and the frame period is shortened to ½ of that in a single-row scan. The adjacent frame periods are used to display a left-eye image and a right-eye image, respectively.

In the above liquid crystal display, a dot of the second resolution image is displayed by two high gray level pixels and two low gray level pixels of the liquid crystal display.

In the case where the second resolution image signal is a 2D image signal, the two high gray level pixels and two low gray level pixels are four pixels located at the intersections of two adjacent pixel rows and two adjacent pixel columns.

In the case where the second resolution image signal is a 3D image signal, the two high gray level pixels and two low gray level pixels are four pixels located at the intersections of four adjacent pixel rows and one pixel column.

The above liquid crystal display is driven by column inversion.

The invention also provides a display method of a liquid crystal display, including: providing a first resolution liquid crystal display with a second resolution image signal, wherein dots of the second resolution are fewer than dots of the first resolution; driving a pixel column of the first resolution liquid crystal display with the same polarity; combining at least a high gray level pixel and at least a low gray level pixel to display a dot of the second resolution, wherein the low gray level pixel displays a gray level lower than the high gray level pixel; and outputting a second resolution image, wherein each pixel row of the first resolution liquid crystal display is formed by a plurality of the high gray level pixels or a plurality of the low gray level pixels.

In the above display method, the dot size of the first resolution liquid crystal display is equal to or larger than 0.018 mm$^2$ and equal to or smaller than 0.16 mm$^2$.

In the case where the second resolution image signal is a 2D image signal, when the first resolution liquid crystal display outputs a 2D image, a pixel row formed by the high gray level pixels and a pixel row formed by the low gray level pixels are arranged alternately in the column direction.

In the case where the second resolution image signal is a 3D image signal, when the first resolution liquid crystal display outputs a 3D image, two pixel rows formed by the high gray level pixels and two pixel rows formed by the low gray level pixels are arranged alternately in the column direction.

In the above display method, the first resolution liquid crystal display performs a progressive scan in such a manner that every two pixel rows are scanned at the same time, and the adjacent frame periods are used to display a left-eye image and a right-eye image, respectively.

In the above display method, a dot of the second resolution is displayed by two high gray level pixels and two low gray level pixels of the liquid crystal display.

In the case where the second resolution image signal is a 2D image signal, the two high gray level pixels and two low gray level pixels are four pixels located at the intersections of two adjacent pixel rows and two adjacent pixel columns.

In the case where the second resolution image signal is a 3D image signal, the two high gray level pixels and two low gray level pixels are four pixels located at the intersections of four adjacent pixel rows and one pixel column.

In the above display method, the first resolution liquid crystal display is driven by column inversion.

According to the above embodiments, the invention finds out the arrangement where only high gray level pixels or only low gray level pixels are arranged in the horizontal direction is the best arrangement when a high-resolution LCD panel uses the low color-shift technique to display a low-resolution image. Under this arrangement, in addition to a wide viewing angle, low horizontal crosstalk and contours can be ensured to improve image quality. Further, the high-resolution LCD panel adopts different arrangements to display a 2D image and a 3D image respectively. When a low-resolution 2D image signal is input to the high-resolution LCD panel, the arrangement where only high gray level pixels or only low gray level pixels are arranged in the horizontal direction and a high gray level pixel and a low gray level pixel are alternately arranged in the vertical direction is adopted. When a low-resolution 3D image signal is input to the high-resolution LCD panel, the arrangement where only high gray level pixels or only low gray level pixels are arranged in the horizontal direction and two high gray level pixels and two low gray level pixels are alternately arranged in the vertical direction is adopted.

BRIEF DESCRIPTION OF THE DRAWINGS

The present invention can be more fully understood by reading the subsequent detailed description and examples with references made to the accompanying drawings, wherein:

FIG. 1 is a diagram showing a driving method of a 4K2K LCD input with Full HD 2D-images in accordance with an embodiment of the invention, wherein

FIG. 2 is a diagram showing a driving method of a 4K2K LCD input with Full HD 3D images in accordance with an embodiment of the invention, wherein

FIGS. 3A-3G show 6 arrangements of high gray level pixels and low gray level pixels when the 4K2K LCD panel displays a Full HD image.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The liquid crystal display and its display method of the invention can be applied in 2D display mode and 3D display mode. Therefore, driving methods of a 4K2K liquid crystal display of the invention applied in a Full HD 2D display mode and a Full HD 3D display mode are described.

Figure 1A:
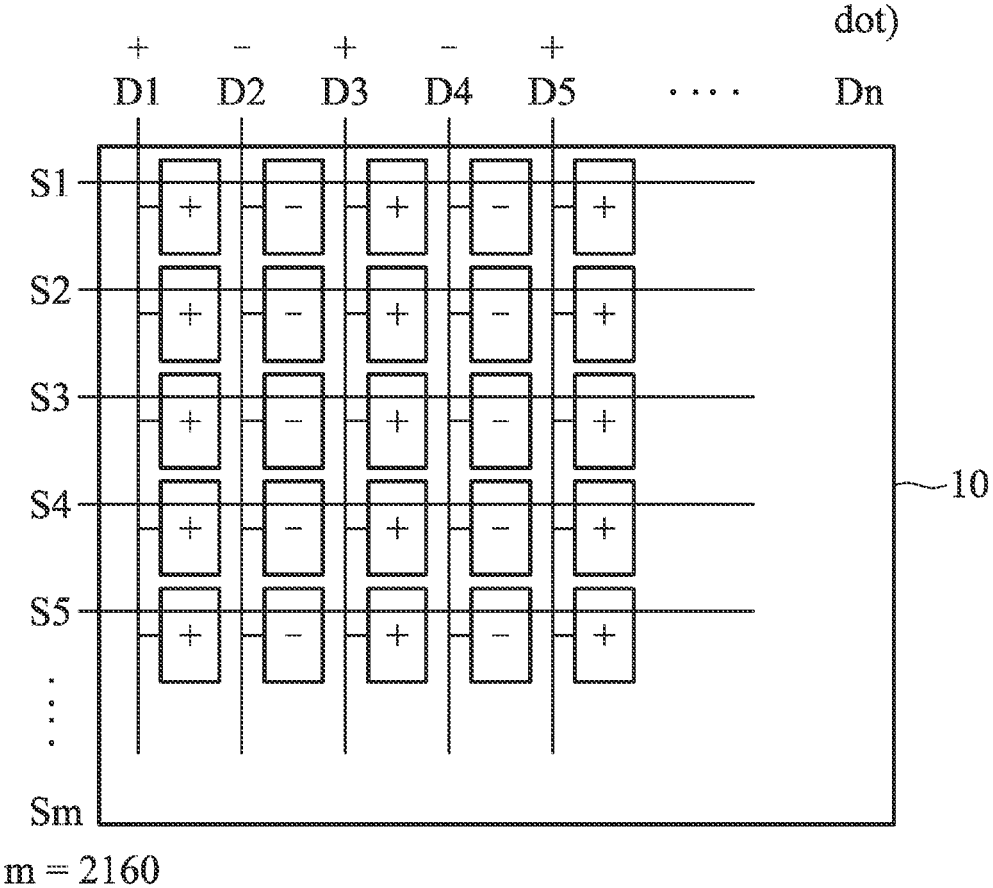
FIG. 1A is a schematic diagram of a 4K2K LCD panel, and FIG. 1B a timing chart of signals of scan lines and data lines provided to the 4K2K LCD panel.
Figure 1B:
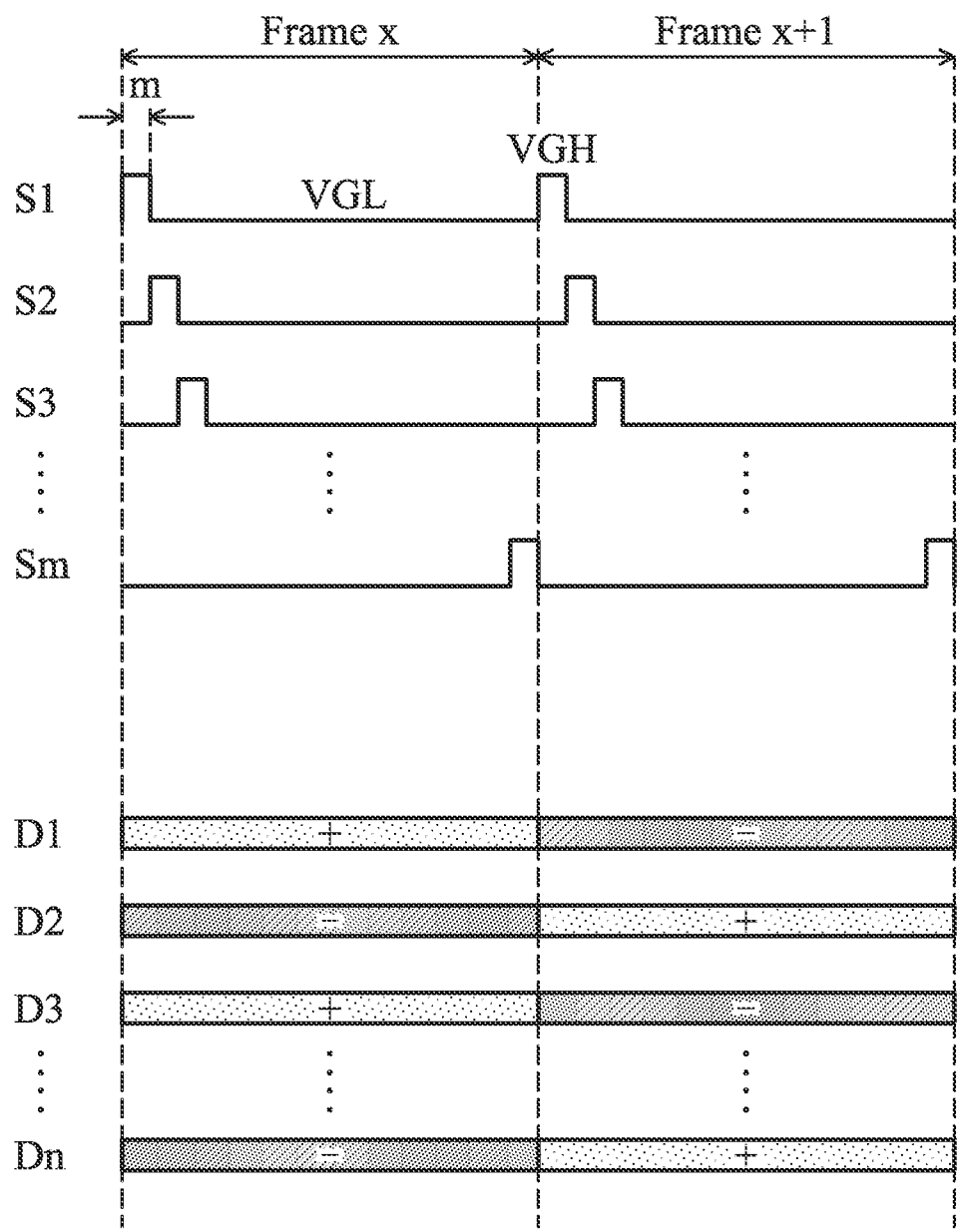

FIG. 1 is a diagram showing a driving method of a 4K2K LCD input with Full HD 2D-images in accordance with an embodiment of the invention, wherein FIG. 1A is a schematic diagram of a 4K2K LCD panel, and FIG. 1B a timing chart of signals of scan lines and data lines provided to the 4K2K LCD panel.

As shown in FIG. 1A, a 4K2K LCD panel 10 has m scan lines S1, S2, S3, . . . , and Sm, and n data lines D1, D2, D3, . . . , and Dn. In the embodiment, assuming that the resolution of 4K2K is 3840×2160, the number of scan lines is 2160 and the number of data lines is 3840×(the number of pixels per dot).

The 4K2K LCD panel 10 is driven in the manner of a pixel column provided with data of the same polarity. Take FIG. 1A for example: in a frame period, the first pixel column is provided by the data line D1 with data of positive polarity, the second pixel column is provided by the data line D2 with data of negative polarity, and so on.

From FIG. 1B, it is understood that the output timings of signals of the scan lines S1, S2, S3, . . . , and Sm and the data lines D1, D2, D3, . . . , and Dn. The scan is a progressive scan. In a given frame period, the level of the signal of each of the scan lines S1, S2, S3, . . . , and Sm is transited to high level VGH and then low level VGL sequentially.

The method of driving is column inversion. In a given frame period, each data line outputs data signals with the same polarity, but adjacent data lines output data signals with opposite polarities. In the next frame period, each data line outputs a signal with a polarity opposite to that of the signal output in the previous frame period.

Figure 2A:
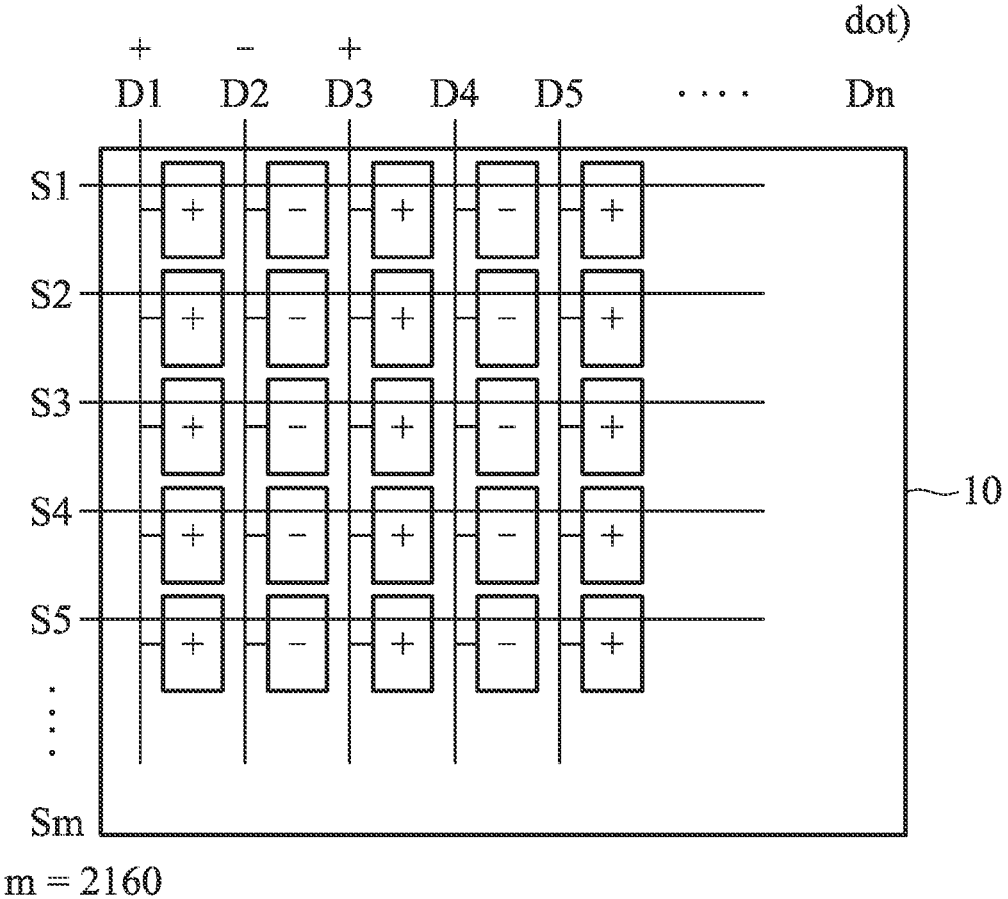
FIG. 2A is a schematic diagram of a 4K2K LCD panel, and FIG. 2B a timing chart of signals of scan lines and data lines provided to the 4K2K LCD panel.
Figure 2B:
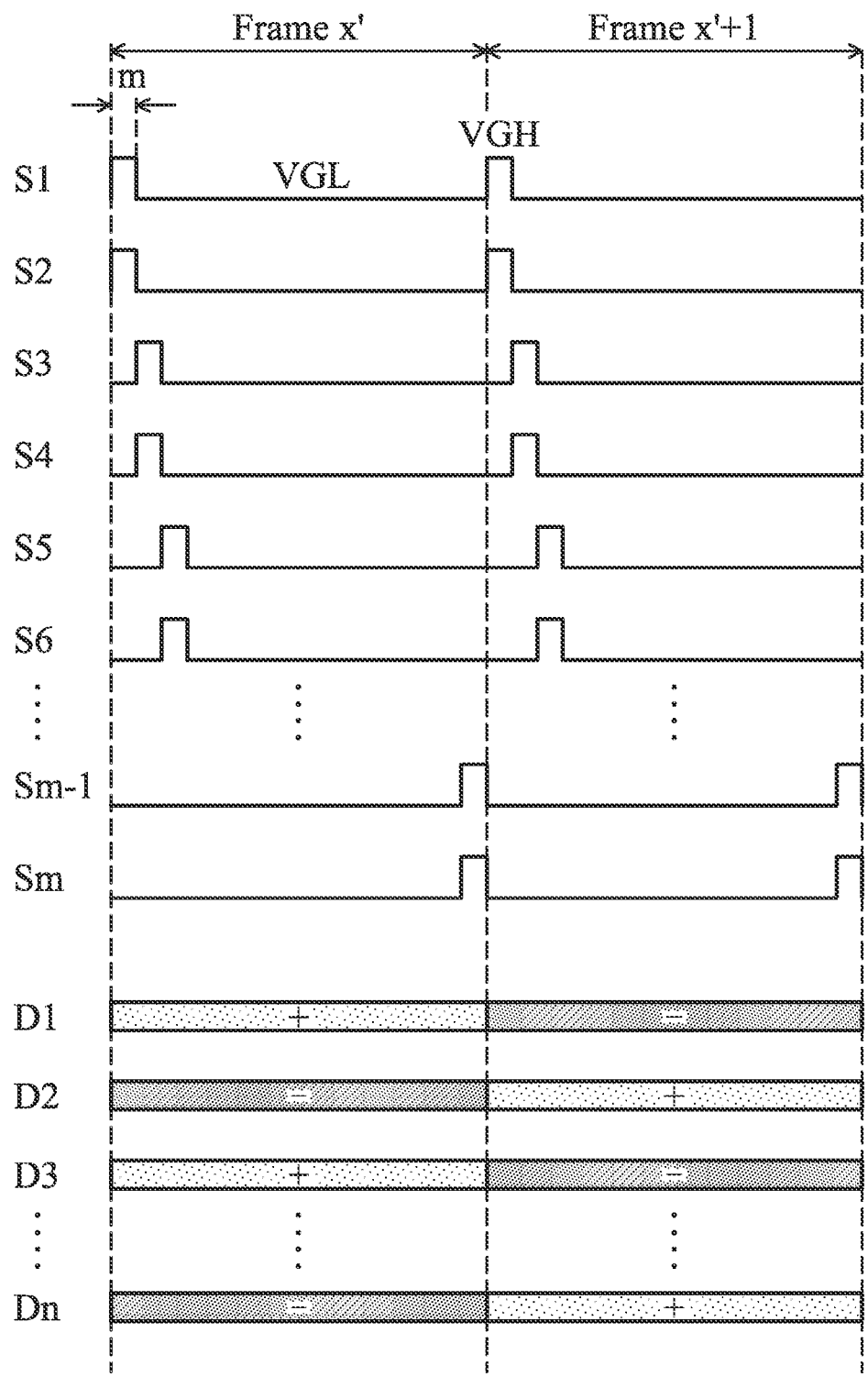

FIG. 2 is a diagram showing a driving method of a 4K2K LCD input with Full HD 3D images in accordance with an embodiment of the invention, wherein FIG. 2A is a schematic diagram of a 4K2K LCD panel, and FIG. 2B a timing chart of signals of scan lines and data lines provided to the 4K2K LCD panel.

When 3D images are displayed, the 4K2K LCD panel 10 is still driven in the manner of a pixel column provided with data of the same polarity. Therefore, FIG. 2A is the same as FIG. 1A and the description for FIG. 2A is omitted.

However, as shown FIG. 2B, when the 4K2K LCD panel 10 displays 3D images, the output timings of signals of the scan lines S1, S2, S3, . . . , and Sm are different from those of the time when the 4K2K LCD panel 10 displays 2D images. The scan is still a progressive scan, but every two scan lines are scanned at the same time (for example, the level of the signals of the scan lines S1 and S2 are transited to high level VGH at the same time) such that data transmitted by data is written to two pixel rows. Therefore, under the same scan speed, the frame period is shortened by half (the length of Frame x'=½ of the length of Frame x). Thereby, two adjacent frames can be used for displaying a left-eye image and a right-eye image, respectively, and the user can watch the 3D images through active shutter glasses. On the other hand, the method of driving is still column inversion. In a frame period, each data line outputs data signals with the same polarity, but adjacent data lines output data signals with opposite polarities. In the next frame period, each data line outputs a signal with a polarity opposite to that of the signal output in the previous frame period.

From the above description, the driving method of a 2K2K LCD panel input with Full HD images is understood. Now, how pixels on the 2K2K LCD panel are used to display a Full HD image is described.

The resolution of a 2K2K LCD panel (namely, the number of total displaying dots) is four times as high as Full HD resolution (length and width are both doubled). Consequently, the 2K2K LCD panel displays a Full HD image in such a manner that 4 dots arranged in a 2×2 matrix jointly display a dot of the Full HD image.

The 2K2K LCD panel of the invention is a display panel with small dot size. For example, the dot size is equal to or larger than 0.018 mm² and equal to or smaller than 0.16 mm² Since the pixel size is small, dividing a pixel into a high gray level area and a low gray level area will increase wirings and a black matrix located between the high and low gray level areas. This reduces the aperture of each pixel substantially. Therefore, an LCD panel with a dot size equal to or larger than 0.018 mm² and equal to or smaller than 0.16 mm² will not divide a pixel into a high gray level area and a low gray level area to achieve low color shift. However, when the image to be displayed has a resolution lower than the resolution of the LCD panel, a plurality of pixels will be used jointly to display a dot of the low-resolution image. In this way, a half of the plurality of pixels can display a high gray level and the other half can display a low gray level to achieve low color shift.

As described above, when a 2K2K LCD panel displays a Full HD image, 4 pixels jointly display a pixel of a Full HD image. Therefore, 2 pixels can display a high gray level which is higher than the gray level of the dot, and the other 2 pixels can display a low gray level which is lower than the gray level of the pixel. Thereby, because it is difficult to identify the difference between gray levels of adjacent small pixels by the human eye, a gray level mixed by the high gray level and the low gray level will be sensed. This sensed gray level is equal to the gray level of the dot of the Full HD image to be displayed. By combining the high gray level pixels and the low gray level pixels to display a pixel of the Full HD image, the viewing angle of the LCD panel can be increased to lower the color shift.

Several arrangements of high gray level pixels and low gray level pixels according to embodiments of the invention are described below.

Figures 3A, 3B:
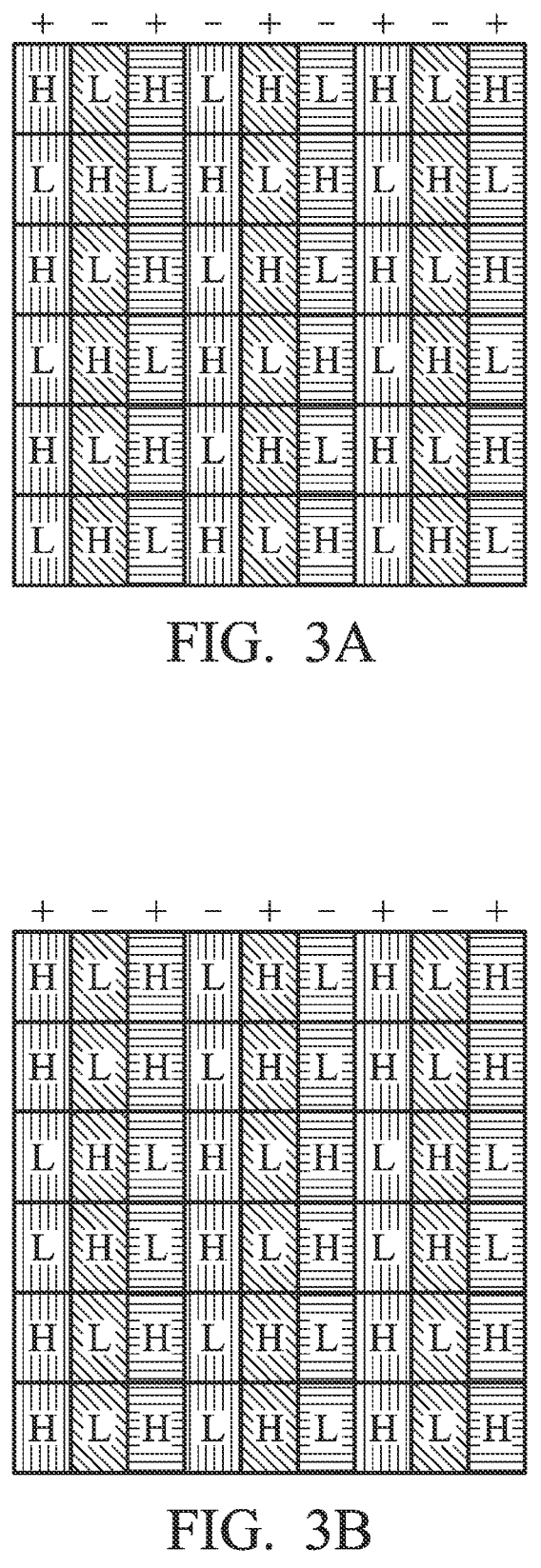
Figures 3C, 3D:
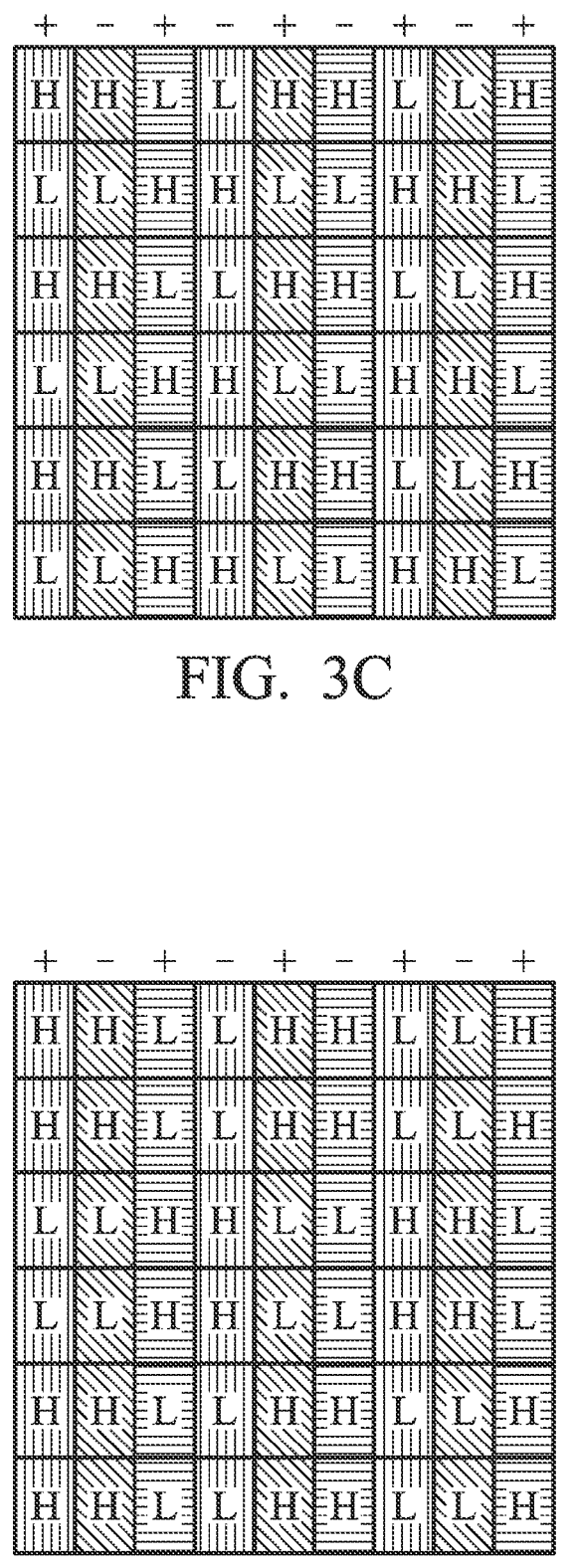
Figures 3E, 3F:
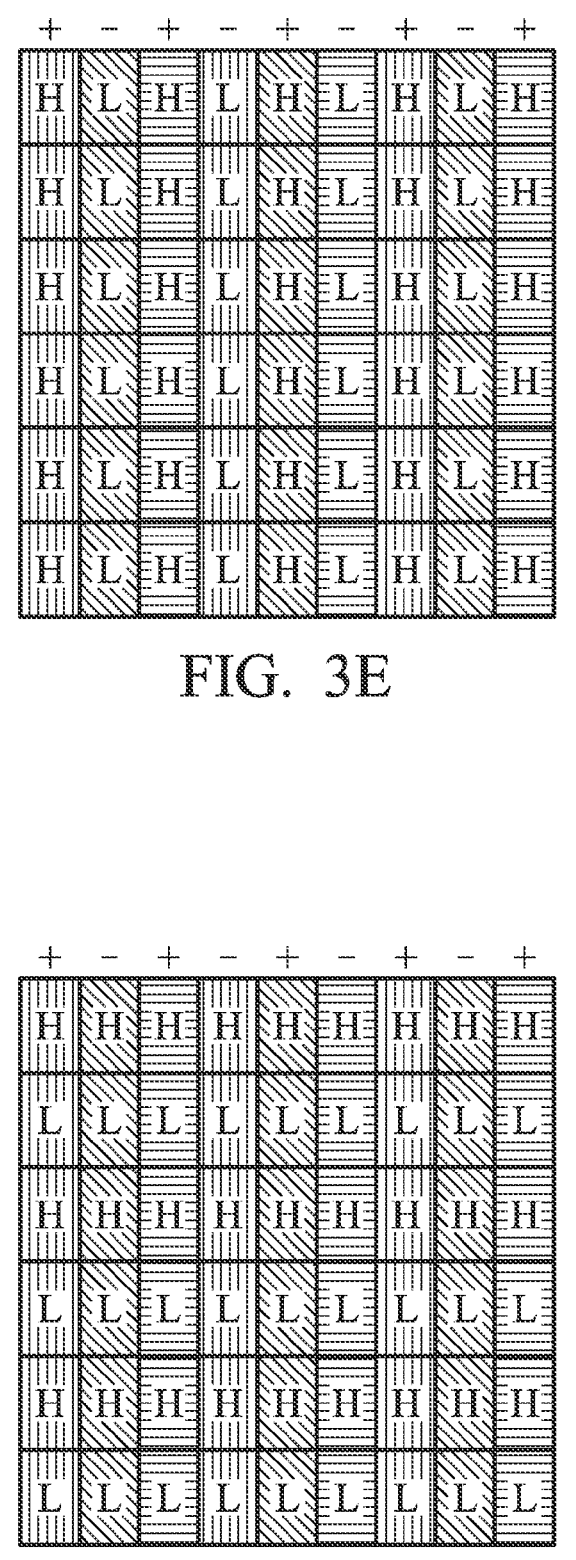
Figure 3G:
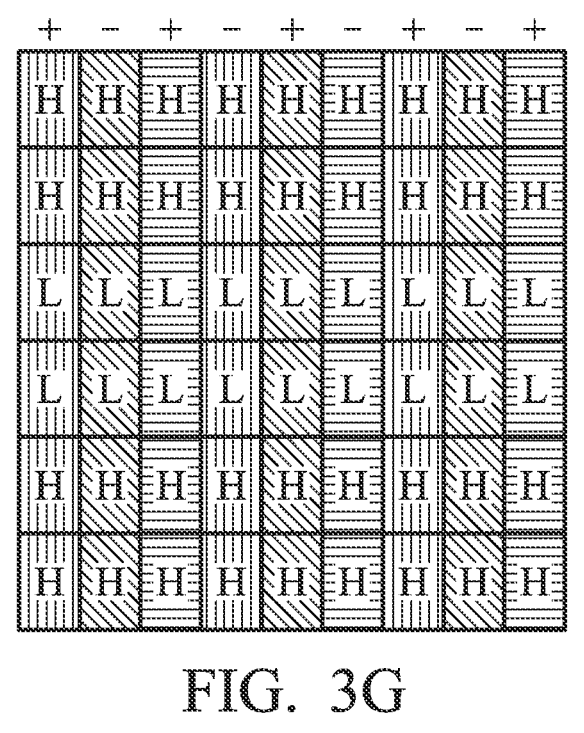

In FIGS. 3A-3G, a high gray level pixel is represented by "H" and a low gray level pixel is represented by "L." Under requirements wherein two of the four pixels displaying the same color arranged in a 2×2 matrix are high gray level pixels and the other two are low gray level pixels, possible arrangements are shown in FIGS. 3A-3G. FIG. 3A shows a high gray level pixel and a low gray level pixel alternately arranged both in the horizontal and vertical directions. FIG. 3B shows a high gray level pixel and a low gray level pixel alternately arranged in the horizontal direction and two high gray level pixels and two low gray level pixels alternately arranged in the vertical direction. FIG. 3C shows two high gray level pixels and two low gray level pixels alternately arranged in the horizontal direction and a high gray level pixel and a low gray level pixel alternately arranged in the vertical direction. FIG. 3D shows two high gray level pixels and two low gray level pixels alternately arranged both in the horizontal and vertical directions. FIG. 3E shows a high gray level pixel and a low gray level pixel alternately arranged in the horizontal direction and only high gray level pixels or only low gray level pixels arranged in the vertical direction. FIG. 3F shows only high gray level pixels or only low gray level pixels arranged in the horizontal direction and a high gray level pixel and a low gray level pixel alternately arranged in the vertical direction. FIG. 3G shows only high gray level pixels or only low gray level pixels arranged in the horizontal direction and two high gray level pixels and two low gray level pixels alternately arranged in the vertical direction. Note that in FIGS. 3A-3G, the high gray level pixels represented by "H" and the low gray level pixels represented by "L" can be exchanged for each other. As such, there are, in fact, two arrangements in each of FIGS. 3A-3G.

Figure 4:
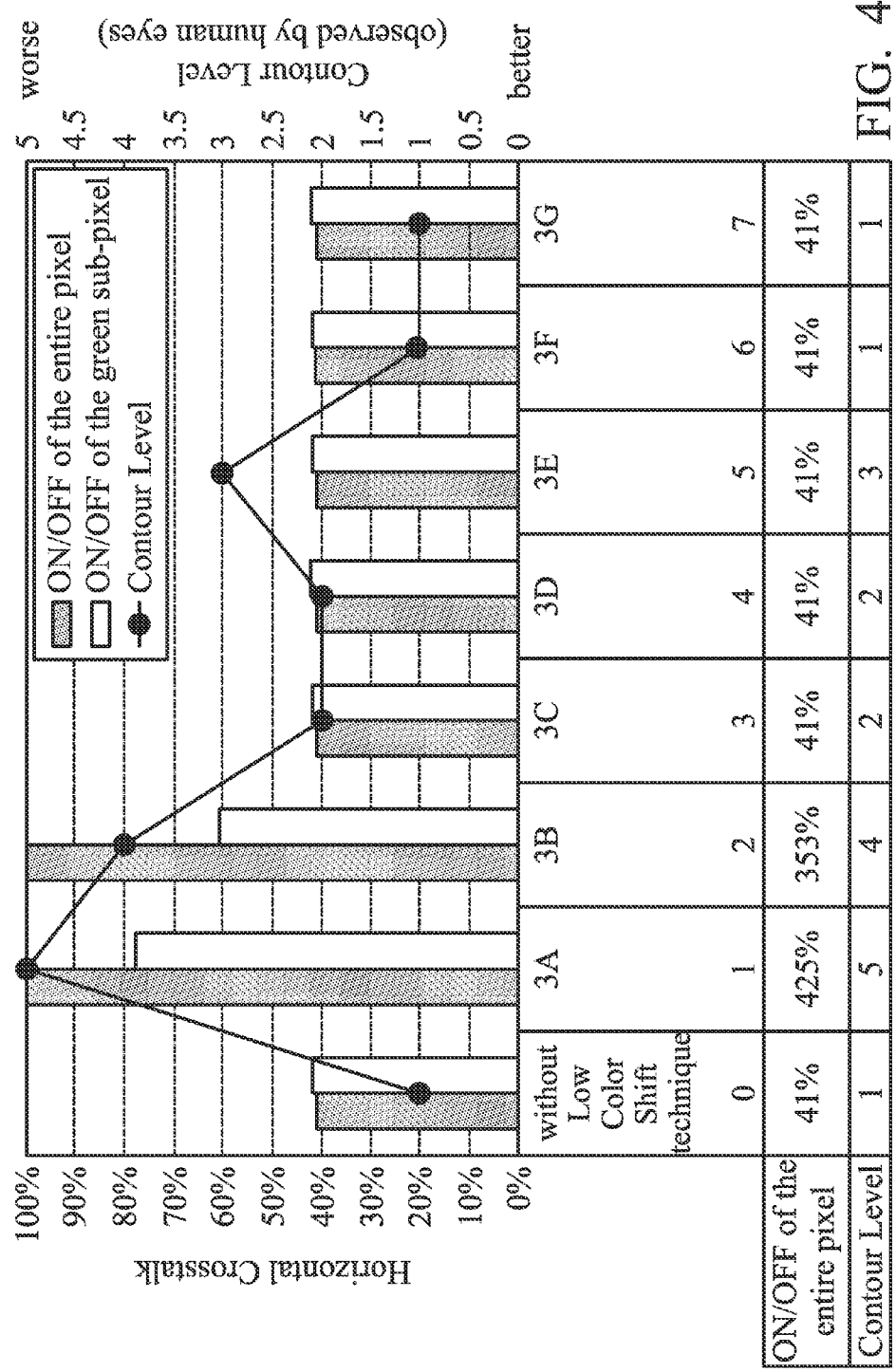
FIG. 4 shows the relation between arrangements of high gray level pixels and low gray level pixels shown in FIGS. 3A-3G and horizontal crosstalk levels or contour levels.

FIG. 4 shows the relation between arrangements of high gray level pixels and low gray level pixels shown in FIGS. 3A-3G and horizontal crosstalk levels or contour levels. The horizontal axis represents 8 models, wherein (from left to right) there are a model to which the low color-shift technique is not applied (a plurality of pixels for displaying a dot are not divided into high and low gray level pixels), and 7 models with arrangements of high and low gray level pixels as shown in FIGS. 3A-3G. The horizontal axis on the left side represents horizontal crosstalk, wherein a higher percentage means more serious horizontal crosstalk. The horizontal axis on the right side represents contour levels, wherein the contour levels are quantified roughly by the human eye, and a higher value means more serious contours and thus a lower image quality. In addition, for the measurement of horizontal crosstalk, two test approaches are performed: a high gray level pixel is achieved by turning on an entire pixel, and a low gray level pixel is achieved by turning off an entire pixel; a high gray level pixel is achieved by turning on only the green sub-pixel of an entire pixel, and a low gray level pixel is achieved by turning off all sub-pixels of an entire pixel.

As shown in FIG. 4, considering the horizontal crosstalk, the models of FIGS. 3C-3G and the model to which the low color-shift technique is not applied have the lowest horizontal crosstalk level (about 41%). Considering the contour level, only the models of FIGS. 3F and 3G have an image quality (the lowest level 1) equal to the model to which the low color-shift technique is not applied. Accordingly, in consideration of both the horizontal crosstalk and the contour level, FIGS. 3F and 3G are the best arrangements of high and low gray level pixels for the 2K2K LCD panel to display a Full HD image.

Because FIGS. 3F and 3G are the best arrangements of high and low gray level pixels, one of FIGS. 3F and 3G can be applied when the 2K2K LCD panel displays a Full HD 2D image, and the other can be applied when the 2K2K LCD panel displays a Full HD 3D image. In the case where a Full HD 2D image signal is input to the 2K2K LCD panel, the scan is a progressive scan, so the arrangements of FIGS. 3F and 3G should be applicable. However, in FIG. 3G, pixels in the first and second pixel rows are high gray level pixels, and pixels in the third and fourth pixel rows are low gray level pixels, such that for a dot of a Full HD image displayed by four pixels (displaying the same color) of a 2×2 matrix, the four pixels of a 2×2 matrix in the first and second rows become all high gray level pixels, and the four pixels of a 2×2 matrix in the third and fourth rows become all low gray level pixels. Accordingly, a low color shift cannot be achieved by combining high and low gray level pixels to display a pixel. Therefore, in the case where a Full HD 2D image signal is input to the 2K2K LCD panel, the arrangement of high and low gray level pixels shown in FIG. 3F is adopted. Namely, only high gray level pixels or only low gray level pixels are arranged in the horizontal direction and a high gray level pixel and a low gray level pixel are alternately arranged in the vertical direction.

In the case where a Full HD 3D image signal is input to the 2K2K LCD panel, as described above, the scan manner is still a progressive scan, but every two scan lines are scanned at the same time. In this way, two pixel rows scanned at the same time are written with the same data. Therefore, the arrangement where a high gray level pixel and a low gray level pixel are alternately arranged in the vertical direction as shown in FIG. 3F is not applicable under this driving scheme. The arrangement of high and low gray level pixels shown in FIG. 3G should be adopted. Namely, only high gray level pixels or only low gray level pixels are arranged in the horizontal direction, and two high gray level pixels and two low gray level pixels are alternately arranged in the vertical direction. Note that when the 2K2K LCD panel displays a Full HD 3D image, a dot of the Full HD image is not displayed by 4 pixels of a 2×2 matrix, but by 4 pixels of a 4×1 matrix.

According to the embodiments, the invention finds out the arrangement where only high gray level pixels or only low gray level pixels are arranged in the horizontal direction is the best arrangement when the 2K2K LCD panel uses the low color-shift technique to display a Full HD image. Under this arrangement, in addition to a wide viewing angle, a low horizontal crosstalk and contours can be ensured to improve image quality. Furthermore, the 2K2K LCD panel adopts different arrangements to display a 2D image and a 3D image. When a Full HD 2D image signal is input to the 2K2K LCD panel, the arrangement where only high gray level pixels or only low gray level pixels are arranged in the horizontal direction and a high gray level pixel and a low gray level pixel are alternately arranged in the vertical direction is adopted. When a Full HD 3D image signal is input to the 2K2K LCD panel, the arrangement where only high gray level pixels or only low gray level pixels are arranged in the horizontal direction, and two high gray level pixels and two low gray level pixels are alternately arranged in the vertical direction, is adopted.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements. For example, the invention describes a 2K2K LCD panel displays a Full HD image, but the invention is not limited to a 2K2K LCD panel. When another high-resolution LCD panel displays a low-resolution image (for example, when a 8K4K LCD panel displays a 2K2K image), the arrangement where only high gray level pixels or only low gray level pixels are arranged in the horizontal direction can also be adopted to achieve low color shift and maintain the lowest horizontal crosstalk and contours.

What is claimed is:

1. A liquid crystal display, comprising:
a plurality of dots arranged in a matrix formed with pixel columns and pixel rows, wherein each of the dots comprises at least a pixel and is used for displaying a dot of a first resolution image, and the dot size is equal to or larger than 0.018 mm$^2$ and equal to or smaller than 0.16 mm$^2$,
wherein when the liquid crystal display receives a second resolution image signal having dots fewer than the first resolution image, a dot of a second resolution image is displayed by at least a high gray level pixel and at least a low gray level pixel which displays a gray level lower than the high gray level pixel, and each of the pixel rows is formed by a plurality of the high gray level pixels or a plurality of the low gray level pixels, and
wherein when the liquid crystal display receives the first resolution image signal, each of the pixel columns is supplied with driving signals having the same polarity, and when the liquid crystal display receives the second resolution image signal, each of the pixel columns is supplied with driving signals having the same polarity.

2. The liquid crystal display as claimed in claim 1, wherein in the case where the second resolution image signal is a 2D image signal, when the liquid crystal display outputs the second resolution image, a pixel row formed by the high gray level pixels and a pixel row formed by the low gray level pixels are arranged alternately in the column direction.

3. The liquid crystal display as claimed in claim 1, wherein in the case where the second resolution image signal is a 3D image signal, when the liquid crystal display outputs the second resolution image, two pixel rows formed by the high gray level pixels and two pixel rows formed by the low gray level pixels are arranged alternately in the column direction.

4. The liquid crystal display as claimed in claim 3, wherein the liquid crystal display performs a progressive scan in such a manner that every two pixel rows are scanned at the same time, and the frame period is shortened to ½ of that in a single-row scan.

5. The liquid crystal display as claimed in claim 4, wherein the adjacent frame periods are used to display a left-eye image and a right-eye image, respectively.

6. The liquid crystal display as claimed in claim 1, wherein a dot of the second resolution image is displayed by two high gray level pixels and two low gray level pixels of the liquid crystal display.

7. The liquid crystal display as claimed in claim 6, wherein in the case where the second resolution image signal is a 2D image signal, the two high gray level pixels and two low gray level pixels are four pixels located at the intersections of two adjacent pixel rows and two adjacent pixel columns.

8. The liquid crystal display as claimed in claim 6, wherein in the case where the second resolution image signal is a 3D image signal, the two high gray level pixels and two low gray level pixels are four pixels located at the intersections of four adjacent pixel rows and one pixel column.

9. The liquid crystal display as claimed in claim 1, wherein the liquid crystal display is driven by column inversion.

10. A display method of a liquid crystal display, comprising:
providing a first resolution liquid crystal display with one of a first resolution image signal and a second resolution image signal, wherein dots of the second resolution are fewer than dots of the first resolution;
driving a pixel column of the first resolution liquid crystal display with the same polarity when the first resolution liquid crystal display is provided with either the first resolution image signal or the second resolution image signal;
in the case where the first resolution liquid crystal display is provided with the second resolution image signal, combining at least a high gray level pixel and at least a low gray level pixel to display a dot of the second resolution, wherein the low gray level pixel displays a gray level lower than the high gray level pixel; and
outputting a second resolution image, wherein each pixel row of the first resolution liquid crystal display is formed by a plurality of the high gray level pixels or a plurality of the low gray level pixels.

11. The display method as claimed in claim 10, wherein the dot size of the first resolution liquid crystal display is equal to or larger than 0.018 mm$^2$ and equal to or smaller than 0.16 mm$^2$.

12. The display method as claimed in claim 10, wherein in the case where the second resolution image signal is a 2D image signal, when the first resolution liquid crystal display outputs a 2D image, a pixel row formed by the high gray level pixels and a pixel row formed by the low gray level pixels are arranged alternately in the column direction.

13. The display method as claimed in claim 10, wherein in the case where the second resolution image signal is a 3D image signal, when the first resolution liquid crystal display outputs a 3D image, two pixel rows formed by the high gray level pixels and two pixel rows formed by the low gray level pixels are arranged alternately in the column direction.

14. The display method as claimed in claim 13, wherein the first resolution liquid crystal display performs a progressive scan in such a manner that every two pixel rows are scanned at the same time, and the adjacent frame periods are used to display a left-eye image and a right-eye image, respectively.

15. The display method as claimed in claim 10, wherein a dot of the second resolution is displayed by two high gray level pixels and two low gray level pixels of the liquid crystal display.

16. The display method as claimed in claim 15, wherein in the case where the second resolution image signal is a 2D image signal, the two high gray level pixels and two low gray level pixels are four pixels located at the intersections of two adjacent pixel rows and two adjacent pixel columns.

17. The display method as claimed in claim 15, wherein in the case where the second resolution image signal is a 3D image signal, the two high gray level pixels and two low gray level pixels are four pixels located at the intersections of four adjacent pixel rows and one pixel column.

18. The display method as claimed in claim 10, wherein the first resolution liquid crystal display is driven by column inversion.

\* \* \* \* \*